UNITED STATES PATENT OFFICE.

ADOLF KAYSER, OF BUFFALO, NEW YORK, ASSIGNOR TO THE KAYSER PATENT COMPANY, OF NEW JERSEY.

PROCESS OF MAKING SODIUM ALUMINATE.

SPECIFICATION forming part of Letters Patent No. 454,137, dated June 16, 1891.

Application filed March 20, 1891. Serial No. 385,728. (No specimens.)

*To all whom it may concern:*

Be it known that I, ADOLF KAYSER, of Buffalo, in the county of Erie and State of New York, have invented certain Improvements in Processes of Making Sodium Aluminate, of which the following is a specification.

In Letters Patent of the United States, No. 376,409, issued to me on the 10th day of January, 1888, is described a process of making alkaline silicates and carbonates, in which as the first step a mixture of alkaline chloride with clay is subjected to the direct action of highly-heated gases, the result being the production of an insoluble sodium silico-aluminate—a body containing silica and alumina in acid form with the alkaline oxide as a base, this product being commonly termed "acid salt."

The present invention has in view a direct and economical conversion of this insoluble sodium silico-aluminate into a soluble sodium aluminate, so that the sodium salt and the alumina may be readily separated, and at the same time, if desired, a residual product valuable in the manufacture of water-lime obtained.

In carrying my present process into effect I combine finely-powdered acid salt with finely-divided lime in the form of calcium carbonate, calcium oxide, or calcium oxyhydrate in approximately equal and equivalent proportions. I heat this mixture to a decomposing temperature in a reverberatory furnace or otherwise, as may be found most convenient. This temperature, which must be determined by observation or otherwise in each case, depends, I find, on the temperature at which the acid salt was produced; but it ranges from a sharp red to a high white heat. The temperature must be as high or higher than that under which the acid salt was produced. When the required temperature is reached, the reaction is nearly instantaneous, the sodium chloride present being eliminated by vaporization. The sodium oxide of the sodium silico-aluminate is replaced by the lime and the oxide unites with part of the alumina and produces sodium aluminate. The new product—a soluble sodium aluminate and calcium silico-aluminate—remains in a pulverulent condition, and is next leached with water. The resulting lye is a very pure solution of sodium aluminate, and the residue, practically free from sodium salt, is calcium silico-aluminate. The solution of sodium aluminate so obtained contains a valuable amount of alumina, depending on the quality of the lime employed, and being variable at the will of the operator.

If calcium carbonate or calcium oxide is employed, as mentioned above, the lye will contain the maximum amount of alumina. The minimum amount of alumina is obtained when slaked lime is employed or lime in any of the above forms in large excess.

If sodium carbonate and alumina are to be produced from the sodium-aluminate solution, the latter is treated with carbonic acid in known ways, the result being sodium carbonate and practically pure alumina, which latter is a valuable product for use in chemical processes.

If pure caustic lye is to be produced, milk of lime may be added either to the leaching-fluid or to the solution, the effect being to cause the precipitation of insoluble calcium aluminate in a manner well understood by the skilled chemist.

In my process I am enabled to dissolve a very large part of the alumina from the acid salt, from sixteen to eighteen per cent. being obtainable as against twelve to thirteen per cent., the limit under the ordinary mode of production from cryolite.

The residual calcium silico-aluminate is an excellent material for hydraulic or water lime. Having in view its production for this purpose, I use in the first instance an amount of lime, in either of the forms stated, sufficient to establish the correct proportions between the acids (silica and alumina) and bases (calcium and magnesium) and avoid the necessity of a subsequent mixing.

The cakes of calcium silico-aluminate as delivered from the filler-press should at once be subjected to a drying and calcining process before the carbonic acid of the atmosphere has time to decompose the calcium salt.

Having thus described my invention, what I claim is—

1. The process of manufacturing sodium aluminate from insoluble sodium silico-aluminate, consisting in subjecting a mixture of the sodium silico-aluminate and lime to a decomposing temperature.

2. The process of manufacturing sodium aluminate from insoluble sodium silico-aluminate, consisting in subjecting a mixture of sodium silico-aluminate and lime to a decomposing temperature and then leaching the resulting product.

In testimony whereof I hereunto set my hand this 19th day of March, 1891, in the presence of two attesting witnesses.

ADOLF KAYSER.

Witnesses:
W. R. KENNEDY,
WILLIAM W. MORTIMER,